Patented May 30, 1939

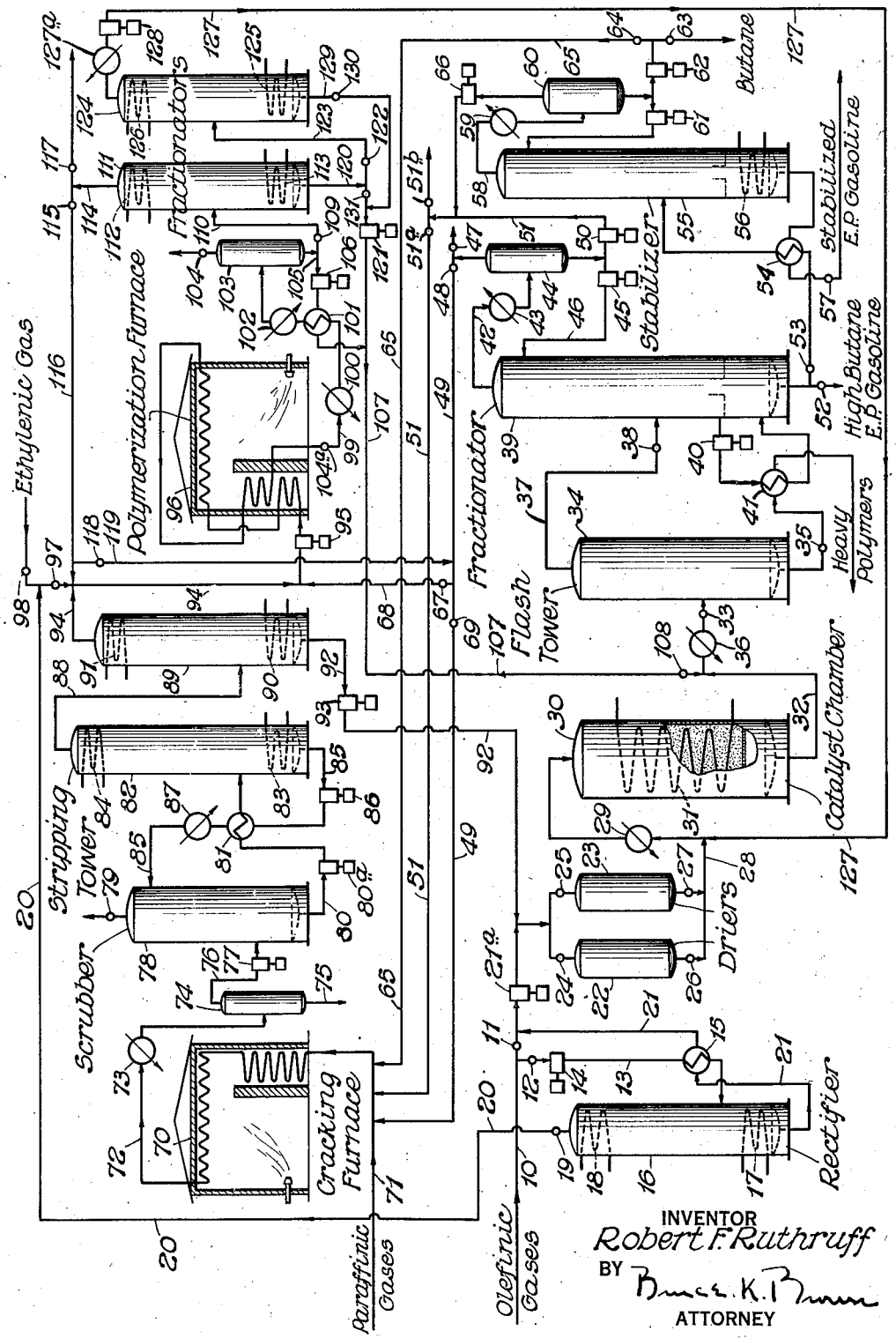

2,160,287

UNITED STATES PATENT OFFICE 2,160,287

CONVERSION OF GASEOUS HYDROCARBONS TO LIQUID

Robert F. Ruthruff, Hammond, Ind., assignor to Standard Oil Company, Chicago, Ill., a corporation of Indiana Application December 17, 1934, Serial No. 757,905
Renewed August 10, 1938

16 Claims. (Cl. 196—10)

My invention relates to an improved process for converting normally gaseous hydrocarbons into normally liquid hydrocarbons and particularly to the improved combination of catalytic and non-catalytic polymerization of such gaseous hydrocarbons.

It is well known that the gaseous olefins, i. e., the unsaturated hydrocarbons of the ethylene series, can be polymerized to form relatively light liquid products at elevated temperatures and pressures in the order of 850 to 1100° F. and 1000–3000 lbs. per square inch. It is also well known that these gaseous olefins can also be polymerized to liquids at lower temperatures and pressures by means of catalysts, particularly those of the aluminum chloride type. I have found that certain catalysts of the aluminum chloride type polymerize the heavier gaseous olefins such as propylene, butylene and iso-butylene readily but have relatively little action on ethylene. My improved process consists, in its bare essentials, of a combination of high pressure non-catalytic polymerization of ethylene, together with catalytic polymerization of the propylene-butylene fraction at lower temperatures and pressures.

Briefly describing my process, I start with a mixture of olefinic gases, including ethylene, propylene, and butylene in varying proportions and ordinarily in admixture with inert gases of the paraffin series of similar molecular weight such as ethane, propane and butane. I subject this mixture to catalytic polymerization in the presence of a catalyst of the double salt type wherein aluminum chloride is one of the components, such catalysts being later described in more detail. I then subject the products from this step to fractionation to separate unconverted gases from desired liquid products. The unconverted gases will consist of ethane, propane and butane, together with the majority of any ethylene originally present. I prefer to fractionate these gases so as to obtain an ethane-ethylene fraction, a propane fraction and a butane fraction. The ethane-ethylene fraction, I subject to non-catalytic polymerization at elevated temperatures and pressures. The propane fraction is preferably subjected to cracking at high temperatures of the order of 1500° F. and at relatively low pressure to yield an olefinic gas mixture, wherein ethylene is the predominating olefinic constituent. The butane fraction I preferably withdraw from the system for use in blending with gasoline from other sources, but I may subject all or a part of this unconverted butane fraction to the aforesaid gas cracking step at high temperature and low pressure to produce additional olefinic gases. I may also introduce paraffinic gases, i. e., ethane, propane, and butane from an outside source, as feed gas to aforesaid gas cracking step. Following the gas cracking step I fractionate the gaseous products therefrom and while ethylene will be the main olefinic constituent, there may be a varying proportion of propylene and even butylene, depending on the composition of the paraffinic gas mixture which is cracked. Any such propylene and butylene resulting from the gas cracking step I subject to catalytic polymerization, as afore-described while subjecting the ethylene from the cracking step to non-catalytic polymerization as afore-described.

My invention will be more thoroughly understood by reference to the attached drawing which forms part of this specification and which represents a diagrammatic elevational view of suitable apparatus for carrying out my process.

Referring to the drawing, olefinic gases are introduced through line 10. These gases may contain ethylene, propylene, butylene and isobutylene in admixture with inert gases, said inert gases being predominatingly paraffinic gases of similar molecular weight, the concentration of total olefinic gases in the mixture being in the range of 15 to 70%, but ordinarily in the range of 25 to 50%.

I may immediately separate the ethane-ethylene fraction from the gas mixture, in which case I close valve 11 in line 10 and open valve 12 in line 13, which leads through pump 14 and heat exchanger 15 to rectifier 16 which is provided with suitable heating means 17 in the base thereof and suitable cooling means 18 at the top thereof. By this means the ethane-ethylene fraction is drawn off through valve 19 in line 20 and is passed to the high pressure polymerization step later described. The residual propylene-butylene fraction is drawn off from rectifier 16 through line 21 passing through heat exchanger 15 and returning to line 10.

The mixture of olefinic gases in line 10 (freed or not freed from ethane-ethylene as above described) is then passed by pump 21a through driers 22 and 23 which are in parallel and are provided with valves 24, 25, 26 and 27, whereby one or the other of driers 22 or 23 may be cut out of the system, for replacement of the drying material, without shutting down operations. The dried mixture then passes through line 28 and optionally through a preheater or heat interchanger 29 to catalyst chamber 30 which is ordinarily provided with internal cooling means 31. The driers 22 and 23 are ordinarily necessary since my catalysts are deteriorated rapidly even by small amounts of water in the feed stock, and I preferably maintain sufficient pressure on driers 22 and 23 so that the material passing through them is in liquefied form.

The catalyst chamber 30 and internal cooling means 31 may be of any desired type. The catalyst may be positioned in bulk, as shown, and water or the gases fed to the system may be passed through the coil 31, or the chamber may be of a different type, wherein the catalyst is contained in tubes which are surrounded by water, steam, the incoming feed gas, or some other cooling agent. Since the polymerization reactions are exothermic and the temperatures desired are relatively low, some cooling means will ordinarily be necessary.

As catalyst, I use sodium chloro-aluminate or a similar stable double salt of aluminum chloride with another metallic halide, suitably active catalysts being formed by the combination of aluminum chloride with lithium chloride, barium chloride, calcium chloride or cuprous chloride, or by the combination of aluminum bromide with sodium bromide, antimony bromide, or mercuric bromide. Catalysts of this type are readily prepared by melting together the aluminum halide and the selected metallic halide in molecular proportions equivalent to the stable double salt and distributing the molten catalyst on a suitable carrier, such as pumice. Catalysts of this type are characterized by having an active polymerizing action on propylene or butylene, but having relatively little polymerizing action on ethylene itself.

The preferred range of conditions to be maintained in the catalyst chamber 30 are pressures of 200 to 1000 lbs. per square inch and preferably of 500–750 lbs. per square inch, temperatures of 250 to 550° F. and preferably of 300 to 400° F. and a rate of flow of from 800 to 8000 cubic feet of "free" gas (i. e., of gas measured at normal temperature and pressure) per cubic foot of free catalyst chamber volume and preferably a rate of flow of from 1000 to 6000 cubic feet of "free" gas per cubic foot of free catalyst chamber volume.

If the mixture supplied through line 10 is not under pressure equal to the desired operating pressure in chamber 30, this will be supplied by pump 21a in line 10 or a pump (not shown) may be placed in line 28.

The following described fractionation system is illustrative only, and I may use any other arrangement of apparatus whereby the required fractionation of products is attained. The reaction products are withdrawn from chamber 30 through line 32 and passed through valve 33 into flash tower 34 from which through valve 35 the polymerized products heavier than gasoline are withdrawn for suitable disposition. Flash tower 34 will ordinarily be operated under a pressure of from 50 to 350 lbs. per square inch, the pressure being reduced at valve 33. If at the pressure maintained in the flash tower 34 the temperature of the products leaving chamber 30 is not sufficient to distil all gasoline and lighter products from the heavier residue by the self-contained heat of the stream, a heater 36 may be introduced in line 32 or other suitable means for increasing the bottom temperature of the tower 34 may be employed.

Gasoline vapors and unconverted gases are removed from flash tower 34 through line 37 and valve 38 into fractionator 39. Fractionator 39 will ordinarily be operated at the same or slightly lower pressure than flash tower 34, but if desired, it may be operated at a higher pressure, in which case suitable pumping means, not shown, may be introduced in line 37. Fractionator 39 is provided with suitable means for heating the bottom of the tower, such as for example, the reboiling means shown, wherein pump 40 circulates materials from the bottom of the tower through heat exchanger 41 whereby they are heated by interchange with the hot heavy polymers from tower 34. Vapors leaving fractionator 39 through line 42 pass through cooler 43 into separator 44, from which pump 45 returns a certain proportion of the condensed liquids consisting predominatingly of propane through line 46 to the top of fractionator 39 as reflux cooling means. From the top of separator 44 uncondensed gases are removed consisting predominatingly of ethane, which may or may not be admixed with ethylene, and may be eliminated from the system through valve 47 or passed through valve 48 in line 49 and utilized as later described.

The liquid condensate collected in the bottom of separator 44 and consisting predominatingly of propane is withdrawn by pump 50 and pumped through line 51 and valve 51a for utilization as later described, or may be withdrawn from the system through valve 51b.

The bottoms product from fractionator 39 consists of endpoint gasoline, i. e., gasoline of desired final boiling point, containing essentially all of the butane which was introduced with the feed in line 10. This proportion of butane may be excessive from the standpoint of the desired properties of finished commercial gasoline, but the product may, nevertheless, be withdrawn through valve 52 and, if necessary, blended with gasoline from other sources which is deficient in butane content, whereby an average final gasoline of desired characteristics is obtained.

On the other hand, I may withdraw the bottoms product from fractionator 39 through valve 53 and pass same through heat exchanger 54 into stabilizer 55, which is provided with suitable reboiling means 56 for heating the bottom thereof to a suitable temperature whereby a stabilized gasoline of desired endpoint and desired butane content is removed from the bottom through valve 57 and preferably through heat exchanger 54. The pressure in stabilizer 55 will ordinarily be somewhat lower than that in fractionator 39. Vapors are removed from the top of stabilizer 55 through line 58 and cooler 59 into reflux drum 60 from the bottom of which pump 61 returns a certain proportion of the condensate therein to the top of stabilizer 55 as reflux cooling means while pump 62 sends the balance of the condensate, which consists predominatingly of butane, through valve 63 and out of the system for suitable disposal, or through valve 64 in line 65 for utilization as later described. Uncondensed gases from reflux drum 60, if any, may contain a considerable proportion of propane and may be forced by pump 66 into the main stream of propane in line 51.

Butane which is removed from the system through valve 63, as above described, will ordinarily be blended with gasoline from other sources.

Referring to the ethane stream in line 49 from separator 44, if the previously described rectifier 16 has been by-passed through valve 11, the stream in line 49 will contain substantially all of the ethylene which was originally present in the mixture in line 10. In this case, I will ordinarily pass this stream through valve 67 in line 68 to the high pressure polymerization furnace later described in detail, but if there was no ethylene present in the mixture in line 10, or if rectifier 16 was operated to remove the ethane-ethylene fraction, then any gas in line 49 will be passed through valve 69 to the gas cracking furnace.

The gas cracking furnace 70 is charged with the paraffinic gas streams from lines 49, 51 and 65, which will contain, respectively, fractions consisting predominatingly of ethane, propane and butane. As previously stated, however, I may withdraw all butane from the system (in gasoline, through valves 53 or 57, or as such, through valve 63), in which case none will be charged through line 65 to furnace 70. I may also additionally charge furnace 70 with paraffinic gases consisting of ethane, propane or butane, or some mixture thereof, from outside sources through line 71.

Cracking furnace 70 is operated under pressures of from zero to 100 lbs. per square inch gauge and at temperatures of 1350 to 1650° F., but preferably at temperatures of about 1500 to 1550° F. Cracked products leaving furnace 70 through line 72 are cooled in cooler 73, which may be of direct oil spray type or may combine direct oil spray with indirect cooling. Following this, the products are passed to separator 74, from which any tarry products formed are withdrawn through line 75, while the gaseous products are withdrawn through line 76 and compressor 77 to scrubber 78 wherein they are contacted with suitable absorber or scrubbing oil while under pressures of 50 to 350 lbs. per square inch. Unabsorbed gases, consisting predominatingly of hydrogen and methane, are removed from the top of scrubber 78 through valve 79. The scrubbing medium used in scrubber 78 will ordinarily be an oil of the character of light gas oil, but lighter products, down to and including liquefied butane, may advantageously be used in certain cases. The enriched scrubbing oil is withdrawn through line 80 and pump 80a, passing through heat exchanger 81 and into stripping tower 82, which is provided with suitable bottom heating means 83 and which may also be provided with top cooling means 84. The stripped scrubbing oil is removed from stripper 82 through line 85 and is passed by pump 86 through heat exchanger 81 and cooler 87 back into scrubber 78. The uncondensed vapors and gases from stripper 82 leaving through line 88 are passed into fractionator 89, which is provided with suitable bottom heating means 90 and top cooling means 91, wherein separation between a propylene-containing fraction as a liquid bottom product (including butylene if any be present) and an ethylene-containing fraction as a gaseous top product may be attained, the pressure in fractionator 89 being suitably controlled to this end. The liquefied propylene fraction from the bottom of fractionator 89 is removed through line 92 and is passed by pump 93 into the catalytic polymerization system previously described.

The gaseous ethylene fraction removed from fractionator 89 through line 94 is passed by compressor 95 into the high pressure non-catalytic polymerization furnace 96, but prior to this the ethylene stream from fractionator 89 may be joined by the ethylene stream from line 68 previously described, or through valve 97 by the ethylene stream from line 20 previously described, and also optionally I may add an ethylene stream from an outside source through valve 98.

The high pressure polymerization furnace 96 is operated under a pressure of from 1000 to 3000 lbs. per square inch and at a temperature of 850 to 1150° F. but preferably of 900 to 950° F. I have illustrated a furnace with a soaking coil type of flow, but in place of this type of flow in the furnace, or supplementary thereto, I may utilize an unheated reaction chamber, not shown, following the heater 96.

Products from polymerization furnace 96 are withdrawn through line 99 through a cooling system, such for example, as that illustrated by cooler 100, heat exchanger 101 and cooler 102, following which the relatively cool products are introduced into separator 103, from which methane and hydrogen are removed through the top thereof through valve 104. The pressure on this system will ordinarily be partially reduced at valve 104a immediately following the exit of polymerization furnace 96. All liquid products and condensed unconverted gases are withdrawn through line 105, pump 106, heat exchanger 101 and are sent through line 107 and valve 108 to join the products from the catalytic polymerization chamber 30 prior to their introduction into flash tower 34. By this means the products and unconverted gases from both polymerization systems are fractionated efficiently in a common system, and the common liquid products are given suitable joint disposition, while the various gas streams from each part of the system are so combined and treated as to give the maximum total yield of final liquid products.

I may also take the products and condensed unconverted gases withdrawn from separator 103 through line 105 and pass them through valve 109 in line 110 to fractionator 111, which is provided with suitable top cooling means 112 and bottom heating means 113 whereby conditions in fractionator 111 are so maintained as to separate essentially all of the ethane and (if any) ethylene from the top thereof through offtake 114. If this gas stream contains appreciable amounts of unconverted ethylene it may be in part recycled directly through valve 115 and line 116 to line 94 entering the polymerization furnace 96, while part of the stream is eliminated through valve 117 or is passed through valve 118 in line 119 to the gas cracking furnace 70 via line 49, by either of which latter means the building-up of excessive concentrations of ethane in the feed to polymerizing furnace 96 is avoided. The bottoms from fractionator 111 are withdrawn through line 120 and sent by pump 121 via line 107 to tower 34 of the common fractionating system previously described.

If appreciable amounts of propylene are present in the unconverted gases from high pressure polymerization furnace 96, I may further fractionate these unconverted gases by passing the bottoms product withdrawn from fractionator 111 by line 120 through valve 122 in line 123 to fractionator 124 which is provided with suitable bottom heating means 125 and top cooling means 126 whereby conditions are maintained therein such that propane-propylene is renewed as vapor through line 127, condenser 127a and is sent by pump 128 to the inlet of chamber 30 wherein its propylene content is catalytically polymerized. The bottom liquid product from fractionator 124 may be conducted through line 129 and valve 130 to line 107 blocked by closing valve 131 and will be thus forced by pump 121 as before described to the fractionating system starting with tower 34.

While the foregoing combination of a low pressure low temperature catalytic polymerization system and a high pressure high temperature non-catalytic polymerization system with a low pressure high temperature gas cracking system represents the most complete form of my improved process, I do not limit myself to the use of gas cracking step in conjunction with the two polymerization steps. If I eliminate the gas cracking system 70–93 inclusive, the basic cooperation between the two polymerization steps remains unchanged. In this event, however, all butane (not eliminated in gasoline produced) must be eliminated from the system through valve 63, and all propane through valve 51b. Furthermore ethane must be prevented from building up in the system. This may be variously accomplished. I may remove all ethane-ethylene from the feed in line 10 by fractionator 16, as previously described, and pass all bottom products from the high pressure polymerization separator 103 to the flash tower 34 as previously described, in which case all ethane (and any ethylene not converted in polymerizer 96) can be eliminated from the system through valve 47. I may not operate fractionator 16, in which case all ethane-ethylene entering the system will pass from separator 44 to high pressure polymerizer 96 via lines 49 and 68, but in this case I cannot return ethane from separator 103 to flash tower 34 without building up ethane in the feed to high pressure polymerizer 96, and hence I must pass liquid bottoms from separator 103 to fractionator 111, whereby ethane can be eliminated from the system through valve 117 (although if much unconverted ethylene be present in line 114 I may recycle a part through valve 115 and line 116 to the high pressure polymerizer 96 while eliminating enough at valve 117 to prevent undesirably high concentrations of ethane from building up in the system.

As will be seen from the foregoing full description of my improved process it provides a method and system whereby the various fractions of the original olefinic gas mixture, and the various unconverted gas fractions, are severally and jointly subjected to catalytic or non-catalytic polymerization, and optionally as appropriate, to cracking to generate additional olefins, to the end that maximum yields of light liquid products are obtained with minimum operating losses and with a minimum of apparatus.

It will be understood that I am not limited in my invention except as expressed in the claims, as follows:

I claim:

1. In the process of producing motor fuel of desired volatility from normally gaseous hydrocarbons containing olefins and butane, the steps comprising subjecting normally gaseous hydrocarbons containing olefins and butane to catalytic polymerization at pressures of approximately 200–1000 lbs. per sq. in. and temperatures of approximately 200–550° F., passing the polymer products to a fractionating zone and removing therefrom the unreacted gases containing less than four carbon atoms each in the molecule, subjecting unreacted gases containing hydrocarbons of less than four carbon atoms each in the molecule to thermal polymerization at pressures of approximately 1000–3000 lbs. per sq. in. and temperatures of approximately 850–1100° F., passing the products from the thermal polymerization step to said fractionating zone, and recovering from said fractionating zone a liquid high antiknock motor fuel containing butane, of desired volatility.

2. In the process of producing liquid hydrocarbons boiling within the gasoline range from normally gaseous hydrocarbons containing olefins and butane, the steps comprising subjecting normally gaseous hydrocarbons containing olefins and butane to catalytic polymerization to produce a high antiknock motor fuel polymer therefrom, fractionating the resulting polymer products in a fractionating zone to produce a fraction of gaseous hydrocarbons containing less than four carbon atoms each in the molecule, subjecting said fraction of gaseous hydrocarbons containing less than four carbon atoms each in the molecule to thermal polymerization at elevated temperatures and pressures, condensing products from the thermal polymerization step and passing condensed products from the thermal polymerization step to the fractionating zone, and recovering from said fractionating zone liquid hydrocarbons boiling within the gasoline range containing butane.

3. In the process of producing a motor fuel product of desired volatility from gaseous hydrocarbons containing olefins and butane, the steps comprising subjecting normally gaseous hydrocarbons containing olefins and butane to catalytic polymerization to produce a motor fuel polymer product therefrom, fractionating the products from the catalytic polymerization step in a fractionating system to produce a fraction of normally gaseous hydrocarbons containing mostly hydrocarbons with less than four carbon atoms each in the molecule, subjecting said fraction of normally gaseous hydrocarbons containing mostly hydrocarbons with less than four carbon atoms each in the molecule to thermal polymerization at elevated temperatures and pressures to convert a portion of these gases into normally liquid hydrocarbons boiling within the gasoline range, separating hydrogen and methane from the products resulting from the thermal polymerization step and passing the remainder of said products from the thermal polymerization step to said fractionating system, and recovering from said fractionating system a liquid motor fuel product containing butane.

4. In the process of producing liquid hydrocarbon products boiling within the gasoline range from gaseous hydrocarbons containing olefins and butane, the steps comprising subjecting normally gaseous hydrocarbons containing olefins and butane to catalytic polymerization at pressures within the range of about 200–1000 pounds per square inch and a temperature within the range of about 200–550° F., passing the polymer products to a fractionating system and recovering therefrom unconverted gases consisting mostly of hydrocarbons having less than four carbon atoms each in the molecule, subjecting said fraction of unconverted gases to thermal polymerization at a pressure within the range of about 1000–3000 pounds per square inch and a temperature within the range of about 850–1100° F., separating hydrogen and methane from the products resulting from the thermal polymerization step and passing the remainder of these products to said fractionating system, and recovering from said fractionating system liquid hydrocarbon products boiling within the gasoline range containing butane.

5. In the process of producing liquid hydrocarbons boiling within the gasoline range from normally gaseous hydrocarbons containing olefins and butane, the steps comprising separating the mixture into a fraction of normally gaseous hydrocarbons containing ethylene as the predominating olefinic constituent and a second fraction containing higher boiling normally gaseous olefins and butane, subjecting the fraction containing higher boiling normally gaseous olefins and butane to catalytic polymerization to convert a portion of the olefins therein into liquid hydrocarbon products boiling within the gasoline range, subjecting said fraction containing ethylene as the predominating olefinic constituent to thermal polymerization at elevated temperatures and pressures sufficient to convert a portion of the ethylene into liquid hydrocarbon products boiling within the gasoline range, separating the bulk of the $C_2$ and lighter gases from the reaction products of the thermal polymerization step and eliminating them from the system, charging the remainder of the reaction products from the thermal polymerization step together with the reaction products from the catalytic polymerization step to a common fractionating system, and recovering therefrom a fraction of unconverted gases and a mixture of liquid hydrocarbon products boiling within the gasoline range which were obtained from thermal and catalytic polymerization steps.

6. In the process of producing liquid hydrocarbon products boiling within the gasoline range from hydrocarbon gases containing olefins and butane, the steps comprising separating normally gaseous hydrocarbons containing olefins and butane into a fraction containing ethylene as the predominating olefinic constituent and a second fraction containing higher boiling normally gaseous olefins and butane, subjecting the fraction containing higher boiling normally gaseous olefins and butane to catalytic polymerization to convert a portion of the olefins therein into liquid hydrocarbon products boiling within the gasoline range, subjecting the fraction containing ethylene as the predominating olefinic constituent to thermal polymerization at elevated temperatures and pressures sufficient to convert a portion of the gases into liquid hydrocarbon products boiling within the gasoline range, separating hydrogen and methane from the products resulting from the thermal polymerization step and passing the remainder of these products together with the products from the catalytic polymerization step to a common fractionating system, and recovering therefrom a fraction of unconverted gases and a liquid hydrocarbon product boiling within the gasoline range containing butane dissolved therein.

7. In the process of producing liquid hydrocarbons boiling within the gasoline range from hydrocarbon gases containing olefins and butane; the steps comprising separating normally gaseous hydrocarbons containing olefins and butane into a fraction containing ethylene as the predominating olefinic constituent and a second fraction containing higher boiling normally gaseous olefins and butane, subjecting the fraction containing higher boiling gaseous olefins and butane to catalytic polymerization at an elevated pressure and a temperature within the range of 200–550° F. to convert a portion of the olefins therein into liquid hydrocarbon products boiling within the gasoline range, subjecting the fraction containing ethylene as the predominating olefinic constituent to thermal polymerization at elevated temperatures and pressures sufficient to convert a portion of the gases into liquid hydrocarbon products boiling within the gasoline range, separating hydrogen and methane from the products resulting from the thermal polymerization step and passing the remainder of these products together with the products from the catalytic polymerization step to a common fractionating system, and recovering therefrom unconverted gases, heavy polymers and liquid hydrocarbons boiling within the gasoline range containing butane dissolved therein.

8. In the process of producing liquid hydrocarbons boiling within the gasoline range from normally gaseous hydrocarbons containing olefins and butane, the steps comprising separating the mixture into a fraction of normally gaseous hydrocarbons containing ethylene as the predominating olefinic constituent and a second fraction containing higher boiling normally gaseous olefins and butane, subjecting the fraction containing higher boiling normally gaseous olefins and butane to catalytic polymerization at an elevated pressure and a temperature within the range of 200–550° F. to convert a portion of the olefins therein into liquid hydrocarbon products boiling within the gasoline range, subjecting said fraction containing ethylene as the predominating olefinic constituent to thermal polymerization at pressures within the range of 1000–3000 pounds per square inch and temperatures within the range of 850–1100° F. to convert a portion of the ethylene into liquid hydrocarbon products boiling within the gasoline range, separating the bulk of the $C_2$ and lighter gases from the reaction products of the thermal polymerization step and eliminating them from the system, charging the remainder of the reaction products from the thermal polymerization step together with the reaction products from the catalytic polymerization step to a common fractionating system, and recovering therefrom a fraction of unconverted gases and a mixture of liquid hydrocarbon products boiling within the gasoline range which were obtained from the thermal and catalytic polymerization steps.

9. The process of converting gas mixtures, containing chiefly $C_2$, $C_3$ and $C_4$ hydrocarbons, into liquid hydrocarbons which comprises separating the mixture into a fraction containing chiefly $C_3$ and $C_4$ hydrocarbons and another fraction containing $C_2$ hydrocarbons as the predominating hydrocarbon constituent, subjecting each fraction in a separate zone to suitable conditions of time, temperature and pressure for converting the gaseous constituents to liquid hydrocarbons boiling within the gasoline range, separating the bulk of the $C_2$ and lighter gases from the reaction products of the lighter gases and eliminating them from the system, charging the remainder of the reaction products resulting from said conversion of the lighter gases to a common fractionating zone together with the reaction products of the $C_3$, $C_4$ hydrocarbons, and separating the unconverted gases from the normally liquid hydrocarbons.

10. The process of converting gas mixtures, containing chiefly $C_2$, $C_3$ and $C_4$ hydrocarbons to liquid hydrocarbons, which comprises separating the mixture into a fraction containing chiefly $C_3$ and $C_4$ hydrocarbons and another fraction containing $C_2$ hydrocarbons as the predominating hydrocarbon constituent, subjecting each fraction in a separate zone to suitable conditions of time, temperature and pressure for converting the gaseous constituents to liquid hydrocarbons boiling within the gasoline range, separating the bulk of the $C_2$ and lighter gases from the reaction products of the lighter gases and eliminating them from the system, charging separated normally gaseous and normally liquid reaction products resulting from said conversion of the lighter gases to a common fractionating zone together with the reaction products of the $C_3$, $C_4$ hydrocarbons, and separating the unreacted gases from the normally liquid hydrocarbons.

11. The process of producing a high yield of motor fuel product of desired volatility from normally gaseous hydrocarbons containing olefins and butane, which comprises separating normally gaseous hydrocarbons containing olefins and butane into a fraction containing ethylene as the predominating olefinic constituent and a second fraction containing higher boiling normally gaseous olefins and butane, subjecting the fraction containing ethylene as the predominating olefinic constituent to polymerization at pressures of approximately 1000–3000 pounds per square inch and temperatures of 850–1100° F., subjecting the fraction containing higher boiling normally gaseous olefins and butane to catalytic polymerization at pressures of 200–1000 pounds per square inch and temperatures of 200–550° F., passing the products from both polymerization steps to a common fractionating system, and recovering therefrom unconverted gases and a motor fuel product having butane dissolved therein, of desired volatility.

12. In the process of producing high antiknock motor fuel of desired volatility from normally gaseous hydrocarbons containing olefins and butane, the steps comprising separating normally gaseous hydrocarbons containing olefins and butane into a fraction containing ethylene as the predominating olefinic constituent and a second fraction containing higher boiling normally gaseous olefins and butane, subjecting said fraction containing ethylene as the predominating constituent to polymerization at pressures within the range of 1000–3000 lbs. per sq. in. and temperatures within the range of 850–1100° F., subjecting the fraction containing higher boiling normally gaseous olefins and butane to catalytic polymerization at pressures within the range of 200–1000 lbs. per sq. in. and temperatures within the range of 200–550° F., passing the products from both polymerization steps to a common fractionating system, recovering therefrom a fraction of unconverted gases and a liquid motor fuel product which contains substantially all of the butane introduced with the feed gases, and blending said motor fuel fraction containing the dissolved butane with a motor fuel fraction from an extraneous source which is deficient in butane content to produce a high antiknock motor fuel of desired volatility.

13. The process of producing liquid hydrocarbon products boiling within the gasoline range from normally gaseous hydrocarbons containing olefins and butane, which comprises separating normally gaseous hydrocarbons containing olefins and butane into a fraction containing ethylene as the predominating olefinic constituent and a second fraction containing higher boiling normally gaseous olefins and butane, subjecting said fraction containing ethylene as the predominating constituent to thermal polymerization at pressures within the range of 1000–3000 lbs. per sq. in. and temperatures within the range of 850–1100° F., subjecting the fraction containing higher boiling normally gaseous olefins and butane to catalytic polymerization at pressures within the range of 200–1000 lbs. per sq. in. and temperatures within the range of 200–550° F., separating hydrogen and methane from the products resulting from the thermal polymerization step and passing the remainder of these products together with the products from the catalytic polymerization step to a common fractionating system, and recovering therefrom a fraction of unconverted gases and liquid hydrocarbon products boiling within the gasoline range containing butane dissolved therein.

14. In the process of producing liquid hydrocarbons boiling within the gasoline range from normally gaseous hydrocarbons containing olefins and butane, the steps comprising separating normally gaseous hydrocarbons containing olefins and butane into a fraction containing ethylene as the predominating olefinic constituent and a second fraction containing higher boiling normally gaseous olefins and butane, subjecting said fraction containing ethylene as the predominating olefinic constituent to thermal polymerization at elevated temperatures and pressures sufficient to convert a portion of the ethylene to liquid hydrocarbon products boiling within the gasoline range, condensing products from the thermal polymerization step, subjecting the fraction containing higher boiling normally gaseous olefins and butane to catalytic polymerization to convert a portion of the olefins therein to liquid hydrocarbon products boiling within the gasoline range, passing condensed products from the thermal polymerization step together with the products from the catalytic polymerization step to a common fractionating system, and recovering therefrom a fraction of unconverted gases and liquid hydrocarbon products boiling within the gasoline range containing substantial amounts of butane.

15. In the process of producing liquid hydrocarbons boiling within the gasoline range from normally gaseous hydrocarbons containing olefins and butane; the steps comprising separating normally gaseous hydrocarbons containing olefins and butane into a fraction containing ethylene as the predominating olefinic constituent and a second fraction containing higher boiling normally gaseous olefins and butane; subjecting said fraction containing ethylene as the predominating olefinic constituent and unconverted gases, hereinafter defined, to thermal polymerization at elevated temperatures and pressures sufficient to convert a portion of the gases to liquid hydrocarbon products boiling within the gasoline range; condensing products from the thermal polymerization step; subjecting the fraction containing higher boiling normally gaseous olefins and butane to catalytic polymerization to convert a portion of the olefins therein to liquid hydrocarbon products boiling within the gasoline range; passing condensed products from the thermal polymerization step together with the products from the catalytic polymerization step to a common fractionating system, and recovering therefrom a fraction of unconverted gases and liquid hydrocarbon products boiling within the gasoline range containing a substantial amount of butane; and recycling unconverted gases to said thermal polymerization step.

16. In the process of producing liquid hydrocarbon products boiling within the gasoline range from hydrocarbon gases containing olefins and butane; the steps comprising separating normally gaseous hydrocarbons containing olefins and butane into a fraction containing ethylene as the predominating olefinic constituent and a second fraction containing higher boiling normally gaseous olefins and butane; subjecting said fraction containing ethylene as the predominating olefinic constituent and unconverted gases, hereinafter defined, to thermal polymerization at elevated temperatures and pressure sufficient to convert a portion of the gases into liquid hydrocarbon products boiling within the gasoline range; subjecting the fraction containing higher boiling normally gaseous olefins and butane to catalytic polymerization to convert a portion of the olefins therein into liquid hydrocarbon products boiling within the gasoline range; separating hydrogen and methane from the products resulting from the thermal polymerization step and passing the remainder of these products together with the products from the catalytic polymerization step to a common fractionating system, and recovering therefrom a fraction of unconverted gases and a fraction of liquid hydrocarbon products boiling within the gasoline range containing a substantial amount of butane; and recycling the unconverted gases to said thermal polymerization step.

ROBERT F. RUTHRUFF.